US010440651B2

(12) United States Patent
MacGougan et al.

(10) Patent No.: US 10,440,651 B2
(45) Date of Patent: *Oct. 8, 2019

(54) OPERATING GEOGRAPHIC LOCATION SYSTESM

(71) Applicant: Apple Inc., Cupertino, CA (US)

(72) Inventors: Glenn Donald MacGougan, San Jose, CA (US); Jay N. Bruins, Los Altos, CA (US); Robert Mayor, Half Moon Bay, CA (US); Ronald Keryuan Huang, San Jose, CA (US); Stephen J. Rhee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/004,642

(22) Filed: Jan. 22, 2016

(65) Prior Publication Data

US 2016/0142979 A1 May 19, 2016

Related U.S. Application Data

(63) Continuation of application No. 13/460,101, filed on Apr. 30, 2012, now Pat. No. 9,253,728.

(51) Int. Cl.
*H04W 52/02* (2009.01)
*H04W 4/02* (2018.01)
(Continued)

(52) U.S. Cl.
CPC ....... *H04W 52/0254* (2013.01); *H04W 4/021* (2013.01); *H04W 52/0274* (2013.01);
(Continued)

(58) Field of Classification Search
CPC . H04W 24/00; H04W 52/0274; H04W 52/02; H04W 4/02; H04W 88/02;
(Continued)

(56) References Cited

U.S. PATENT DOCUMENTS 7,359,713 B1 * 4/2008 Tiwari ................. G01S 19/34
342/105
8,200,251 B2 6/2012 Huang
(Continued)

FOREIGN PATENT DOCUMENTS

GB 2451616 4/2012
WO WO 2011/146141 11/2011

OTHER PUBLICATIONS

Notification of Transmittal of the International Search Report and Written Opinion for corresponding Application No. PCT/US2013/038723, dated Jul. 18, 2013; pp. 1-10.
(Continued)

*Primary Examiner* — Khawar Iqbal
(74) *Attorney, Agent, or Firm* — Jaffery Watson Mendonsa & Hamilton LLP

(57) ABSTRACT

In general, in one aspect, a method includes receiving, on a mobile device, an indication that an application executing on the mobile device has entered a background state, determining, based on data received from a location system of the mobile device, that the mobile device has remained within a geographic area during a time interval, the geographic area being defined by a radius determined according to an application type of the application, and disabling at least a portion of the location system of the mobile device.

43 Claims, 6 Drawing Sheets

(51) Int. Cl.
*H04W 4/021* (2018.01)
*H04M 1/725* (2006.01)
*H04W 88/02* (2009.01)

(52) U.S. Cl.
CPC .... *H04M 1/72569* (2013.01); *H04M 1/72572* (2013.01); *H04M 2250/10* (2013.01); *H04M 2250/12* (2013.01); *H04W 88/02* (2013.01); *Y02D 70/1222* (2018.01); *Y02D 70/1224* (2018.01); *Y02D 70/142* (2018.01); *Y02D 70/144* (2018.01); *Y02D 70/146* (2018.01); *Y02D 70/164* (2018.01)

(58) Field of Classification Search
CPC ... H04W 64/00; H04W 8/22; H04M 1/72569; H04M 2250/12; G01S 19/48; G01S 5/02; G06F 15/16; H04L 51/20; H04L 67/18; H04L 51/32
USPC .............................................. 455/456.1–456.6
See application file for complete search history.

(56) References Cited

U.S. PATENT DOCUMENTS

| | | | |
|---|---|---|---|
| 8,346,240 B2 | 1/2013 | Morales Barbosa | |
| 9,135,802 B2* | 9/2015 | Li | G06F 1/1694 |
| 9,253,728 B2 | 2/2016 | MacGougan et al. | |
| 9,354,722 B2* | 5/2016 | Burca | G06F 3/0346 |
| 9,390,620 B2* | 7/2016 | Gueziec | G08G 1/0112 |
| 2010/0033424 A1 | 2/2010 | Kabasawa et al. | |
| 2010/0194632 A1* | 8/2010 | Raento | H04M 1/72572 342/357.25 |
| 2010/0231383 A1 | 9/2010 | Levine et al. | |
| 2011/0009090 A1 | 1/2011 | Sparks, III | |
| 2011/0077014 A1* | 3/2011 | Heavilin | H04W 68/00 455/446 |
| 2011/0140962 A1* | 6/2011 | McNamara | G01S 5/02 342/357.64 |
| 2011/0309976 A1 | 12/2011 | Leclercq et al. | |
| 2012/0284755 A1 | 11/2012 | Keret | |
| 2013/0150027 A1 | 6/2013 | Leclercq | |
| 2013/0176869 A1 | 7/2013 | Finlow-Bates et al. | |
| 2013/0205196 A1 | 8/2013 | Han | |
| 2013/0210393 A1 | 8/2013 | Hillier | |
| 2013/0238700 A1 | 9/2013 | Papakipos et al. | |
| 2013/0260795 A1 | 10/2013 | Papakipos | |
| 2013/0288718 A1 | 10/2013 | MacGourgan et al. | |
| 2013/0303184 A1* | 11/2013 | Yang | G01S 5/0263 455/456.1 |
| 2014/0073357 A1* | 3/2014 | Johnson | G06F 16/972 455/456.3 |
| 2014/0089913 A1* | 3/2014 | Aaronson | G06F 8/61 717/174 |
| 2014/0370868 A1* | 12/2014 | Agarwal | H04M 3/42263 455/417 |
| 2015/0046554 A1 | 2/2015 | Papakipos et al. | |
| 2017/0019856 A1* | 1/2017 | Papakipos | G06Q 10/10 |

OTHER PUBLICATIONS

Examination Report in TW 102115536, dated Sep. 1, 2014, 10 pages.

* cited by examiner

OPERATING GEOGRAPHIC LOCATION SYSTESM

CROSS-REFERENCE TO RELATED APPLICATIONS

This application is a continuation of and claims priority to pending U.S. application Ser. No. 13/460,101, entitled "Operating Geographic Location Systems," filed on Apr. 30, 2012, the entire contents of which are incorporated herein by reference.

TECHNICAL FIELD

The disclosure generally relates to operating geographic location systems.

BACKGROUND

A mobile device can include one or more location-based applications that are configured to perform location-specific tasks. A mobile device equipped with a receiver of a global navigation satellite system (GNSS), such as the Global Positioning System (GPS), can use a location determined by the GNSS as an input to a location-based application. The GNSS receiver of the mobile device consumes power while in operation and can quickly drain a battery if operated continuously.

SUMMARY

In general, in one aspect, a method includes receiving, on a mobile device, an indication that an application executing on the mobile device has entered a background state, determining, based on data received from a location system of the mobile device, that the mobile device has remained within a geographic area during a time interval, the geographic area being defined by a radius determined according to an application type of the application, and disabling at least a portion of the location system of the mobile device. Implementations may include corresponding systems and computer program products.

Implementations of this aspect may include one or more of the following features. The aspect may include receiving an application type from the application executing on the mobile device, and determining the radius defining the geographic area based on the received application type. The aspect can include determining that the application executing on the mobile device is not assigned an application type applicable to determining the radius defining the geographic area, and determining an application type of the application executing on the mobile device based on second data received from the location system of the mobile device. The second data received from the location system of the mobile device may include data indicative of acceleration of the mobile device. The second data received from the location system of the mobile device may include data indicative of speed of the mobile device. The aspect may include determining, based on data received from the location system of the mobile device, that the mobile device has exited a second geographic area, the geographic area being defined by a second radius determined according to an application type of the application, and enabling the portion of the location system of the mobile device. The aspect may include receiving, on the mobile device, an indication that the application executing on the mobile device has entered a foreground state, and enabling the portion of the location system of the mobile device. The mobile device may be a wireless mobile device. The aspect may include determining based on an absence of data received by the location system that the mobile device is in a location of a type other than a type of location associated with the application executing on the mobile device, and disabling at least a portion of the location system of the mobile device. Disabling at least a portion of the location system of the mobile device may include determining an activity of a user of the mobile device based on data indicative of movement patterns of the mobile device. The location system of the mobile device may include an accelerometer, and the data received from the accelerometer may indicate that the device has remained stationary during the time interval.

Particular implementations provide at least the following advantages. A mobile device can conserve battery power by powering down a GNSS receiver when the mobile device is not moving.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Some mobile devices, such as smartphones, can run applications that use a location system such as a global navigation satellite system (GNSS) receiver. One example of a GNSS receiver is a receiver that uses global positioning system (GPS) technology. Location applications that use GNSS functionality can indicate information to a user of the smartphone such as where he is, where he has been, what direction he is traveling, how fast he is traveling, and other location information. Some smartphones allow a user to place applications into a background state, such that the application will continue to run but will not be visible to the user unless the user brings the application back to the foreground. While in the background state, a location application can continue to use the GNSS receiver to collect data.

The GNSS receiver, when in operation, uses some of the battery power available to the smartphone. Thus, the smartphone can save battery power by disabling the GNSS receiver when a location application is in a background state and if the GNSS receiver is not collecting any new data indicative of the smartphone's location. For example, if the smartphone has not moved a significant distance during a time period, the GNSS can likely be disabled because the data collected by the GNSS receiver is not changing significantly. The smartphone can make a determination about when to disable the GNSS receiver based on the type of location application or applications using the GPS receiver.

Figure 1:
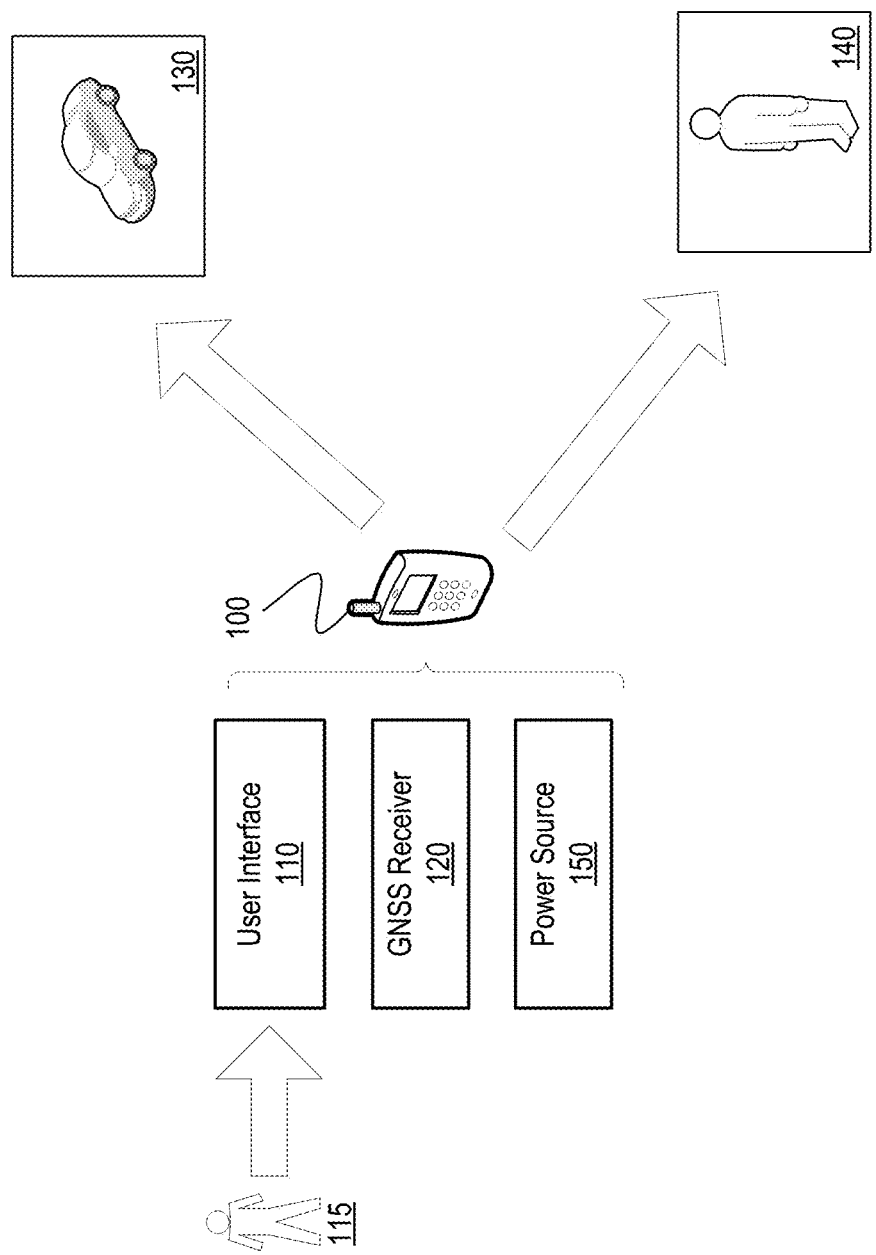
FIG. 1 is a block diagram of a mobile device and related components.

FIG. 1 shows an example of a mobile device 100 (e.g., a wireless mobile device) that runs location-aware applications. The mobile device has a user interface 110 that allows a user 115 such as a human operator of the mobile device 100 to interact with applications that execute on the mobile device. Applications are collections of program code that is executable by computer system components, for example, a processor or collection of processors, of the mobile device 100. The applications can be stored in a data storage facility of the mobile device 100, for example, solid state memory, flash memory, or another kind of data storage. When an application is executed (e.g., after the mobile device 100 receives an indication from the user 115 to execute a particular application), the program code of the application is executed on the mobile device. An application that has program code executing on a mobile device 100 can be said to be running on the mobile device 100.

Some applications are location applications. A location application is an application that uses information about the location of the mobile device 100. The information about the location of the mobile device 100 can be collected once or it can be collected over a period of time. One example of a location application is an automobile navigation application 130. An automobile navigation application 130 can display navigation data on the user interface 110. For example, the navigation data can indicate a current location of the mobile device 100 (and thus a current location of an automobile containing the mobile device), or the navigation data can indicate a path from a source location to a destination location, such as streets and highways to traverse, or the navigation data can indicate other information based on a current location of the mobile device 100. Another example of a location application is a personal fitness application 140. A personal fitness application 140 can display information on the user interface 110 that a user (such as the user 115) can use in personal fitness activities. For example, if the user is running along a running path, the personal fitness application 140 can indicate data such as the user's current location, current running speed, or other information determined based on the location of the mobile device 100 over time. In some examples, the personal fitness application 140 records data such as data about the user's average running speed over one activity or over multiple activities such as multiple running sessions.

Location information used by a location application can be received from a GNSS receiver 120. The GNSS receiver 120 determines a physical location of the mobile device 100, e.g., expressed as longitude and latitude. In some examples, the GNSS receiver 120 determines a physical location of the mobile device 100 by receiving data from satellites in orbit of the earth and calculating a location based on the received data. In use, the GNSS receiver 120 draws power from a power source 150 of the mobile device 100. For example, the power source 150 can be a battery such as a lithium-ion battery.

The user interface 110 may be an example of one or more Graphical User Interfaces (UIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers "to select" or "selecting" or "invoking" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radial buttons, checkboxes and any other mechanism for receiving input from, or providing feedback to a user.

Figure 2:
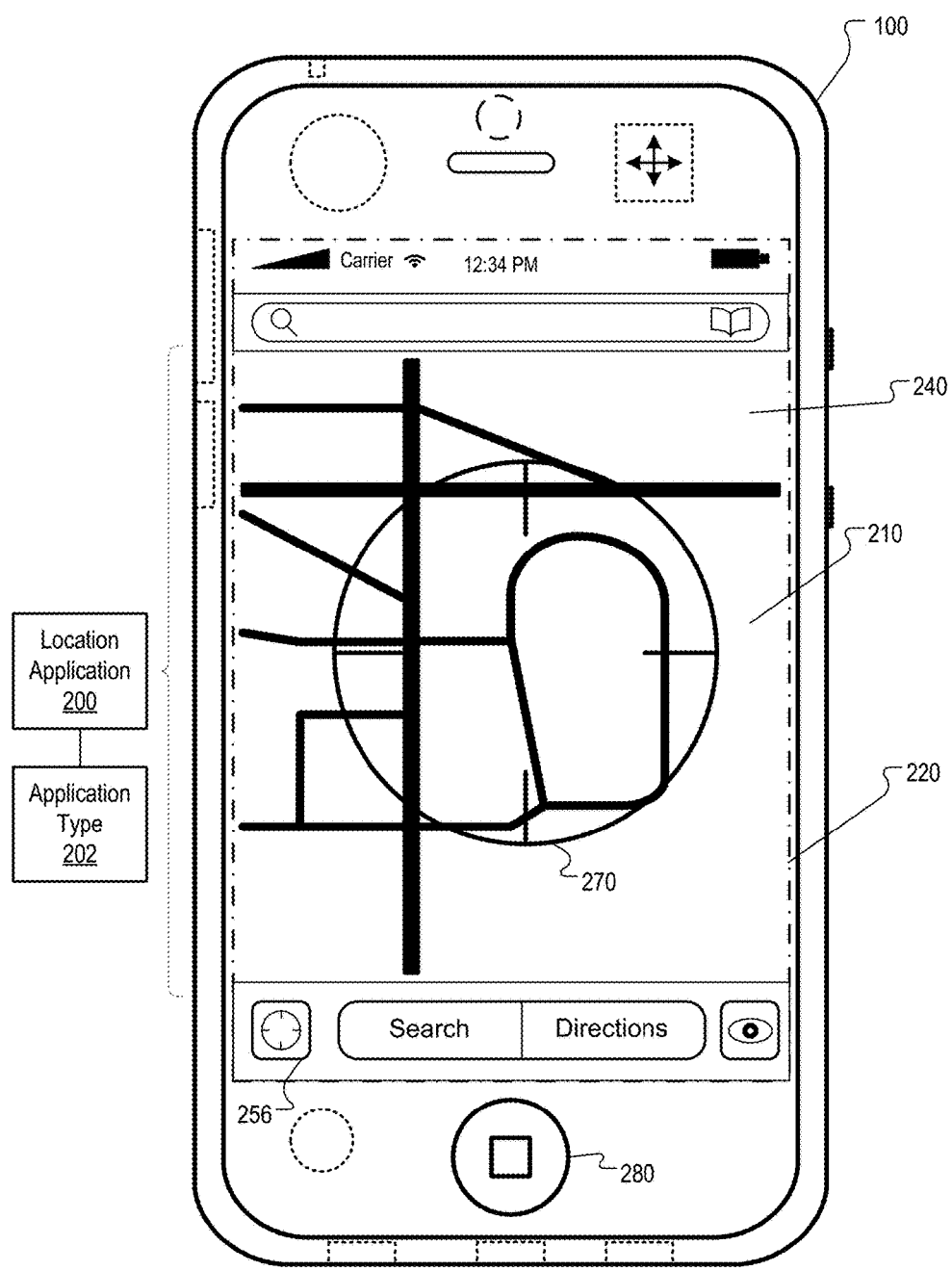
FIG. 2 illustrates an exemplary user interface displaying a location application.

FIG. 2 is an exemplary user interface 210 of the mobile device 100. The user interface 210 could be an example of the user interface 110 shown in FIG. 1. The mobile device 100 can include a touch sensitive display device 220 with which a user of the mobile device 100 can interact with the user interface 210.

The user interface 210 may include user interface elements of a location application 200 running on the mobile device 100. The location application 200 can be an example of one of the location applications 130, 140 shown in FIG. 1. In some examples, the user interface 210 displays data such as data describing the location of the mobile device (e.g., data that can be used for navigation), data chosen based on a location of the mobile device (e.g., data describing nearby points of interest), or other kinds of data to which location is relevant.

In some implementations, the location application 200 is assigned an application type 202. The application type 202 describes an intended use for the location application 200. For example, if the location application 200 is intended for use in automobile navigation, the application type 202 may identify the location application 200 as an automobile navigation application. If the location application 200 is intended for use in personal fitness, the application type 202 may identify the location application 200 as a personal fitness application. The application type 202 can be included in program code of the location application 200, in metadata associated with the location application 200 (e.g., metadata stored in data storage of the mobile device 100), or the application type 202 can be indicated by another technique.

In the example shown in FIG. 2, the location application 200 displays a map 240 of a geographic area on the touch sensitive display device 220. The location application 200 can display the map 240 based on information received from the GNSS receiver 120 shown in FIG. 1. In some examples, the location application 200 displays a map 240 representing the geographic area surrounding the physical location of the mobile device 100. For example, if a user of the mobile devices invokes a current location object 256 (e.g., if a user presses on the touch sensitive display device 220 at the location of the current location object 256), the location application 200 can acquire the geographic location of the mobile device 100 from the GNSS receiver 120. The location application 200 also retrieves map data describing the geographic area surrounding the current geographic location (e.g., from data storage of the mobile device 100, from a geographic data server accessible using a network such as the Internet, or from another source of geographic data). Once the geographic location of the mobile device 100 has been acquired and the map data has been retrieved, the location application 200 can display the map 240 of the current geographic location of the mobile device 100. In some implementations, the location application 200 displays an indication of the location of the mobile device 100. For example, the location application 200 may display a marker indicating the precise location of the mobile device 100.

In some implementations, the location application 200 can enter a background state. When an application is in a background state, the application is running on the mobile device 100 but may display no user interface elements or may display fewer user interface elements than are usually displayed when the application is not in a background state. When the application is not in a background state, the application can be said to be running in a foreground state. For example, the location application 200 may display a map 240 when the location application 200 is in a foreground state but does not display the map 240 when the location application 200 is in a background state. In some implementations, a user can switch the location application 200 from a foreground state to a background state by invoking a user interface element. For example, the location application 200 may switch from a foreground state to a background state when a user presses a home key 280 of the mobile device 100. In some implementations, the location application 200 may switch from a foreground state to a background state after a period of inactivity. For example, if a user has not interacted with the user interface 210 of the location application after a period of time, the location application 200 may switch to a background state. In some examples, the location application 200 can return to the foreground state from the background state when a user invokes a user interface element of the mobile device 100. For example, if the user selects the location application 200 from a list of applications running in a background state on the mobile device 100, the location application returns to a foreground state.

In some examples, the location application 200 makes use of location data received from the GNSS receiver 120 when the location application 200 is in a background state. If the location application 200 is an automobile navigation application, the location application 200 may be used to provide navigation directions to a user who is driving an automobile. For example, a user of the mobile device 100 may have entered directions from a source location to a destination location using the directions object 254. Further, the location application 200 may be configured to provide information to the user while the location application 200 is in a background state. For example, the location application 200 may use an audio output facility of the mobile device 100, such as a speaker, to provide spoken word directions (e.g., "turn left," "exit highway"). Thus, the location application 200 receives location data from the GNSS receiver 120 when the location application 200 is in a background state and the location application 200 is not displaying the map 240 or other elements of the user interface 210. Accordingly, the GNSS receiver 120 may remain active even when applications using the GNSS receiver 120 are not in the foreground.

Because the GNSS receiver 120 draws power from the mobile device 100, the mobile device 100 can conserve stored power if the GNSS receiver 120 is disabled when location applications such as the location application 200 does not need to receive new data from the GNSS receiver 120. One scenario in which a location application 200 does not need to receive new data from the GNSS receiver 120 is a scenario in which the location application 200 has entered a background state and a user of the mobile device 100 is no longer engaged with its functionality. For example, a user of the mobile device 100 may be engaged with the functionality of a location application 200 running in a background state if the location application 200 is still recording location data while running in the background state, or if the location application 200 is providing information (e.g., spoken word audio) to a user of the mobile device 100, or if the location application 200 is otherwise still processing or generating location data of interest to a user of the mobile device 100. If the mobile device 100 has determined that a user of the mobile device 100 may not be engaged with the functionality of any location applications running in the background then the mobile device 100 can disable the GNSS receiver 120 to save battery power.

One technique for determining that a user of the mobile device 100 may not be engaged with the functionality of any location applications is to determine that the mobile device 100 has not changed location over a period of time. For example, if the mobile device 100 has not changed location over a period of time, location applications will receive approximately the same values for location data (e.g., approximately the same longitude and latitude) representative of the current location of the mobile device 100. If the mobile device 100 has not changed location over a period of time, the user of the mobile device 100 is likely no longer engaged in an activity that is relevant to the location applications, for example, activities such as driving an automobile or running.

In use, a mobile device 100 may change location in a minimal fashion even after the user has ended the activity that is relevant to the location applications. For example, a mobile device 100 running an automobile navigation application may still move around in a minimal fashion, for example, if a user carrying the mobile phone has exited his car and is walking around inside a building. Thus, the values for location data (e.g., approximately the same longitude and latitude) representative of the current location of the mobile device 100 may still change even though the mobile device 100 has effectively stopped moving.

One technique for determining that a mobile device 100 has not changed location over a period of time is to establish a boundary of movement for the mobile device 100. A boundary of movement is a representation of a physical area surrounding the mobile device 100 determined based on a current location of the mobile device 100. If the mobile device 100 remains within the boundary of movement for a period of time, the mobile device 100 can be designated as no longer moving and the GNSS receiver 120 of the mobile device 100 can be disabled. If a mobile device 100 exits a boundary of movement, the mobile device 100 can be designated as moving again and the GNSS receiver 120 of the mobile device 100 can be re-activated. In this way, a boundary of movement serves as a threshold of activity relevant to location applications for the mobile device 100.

Figure 3:
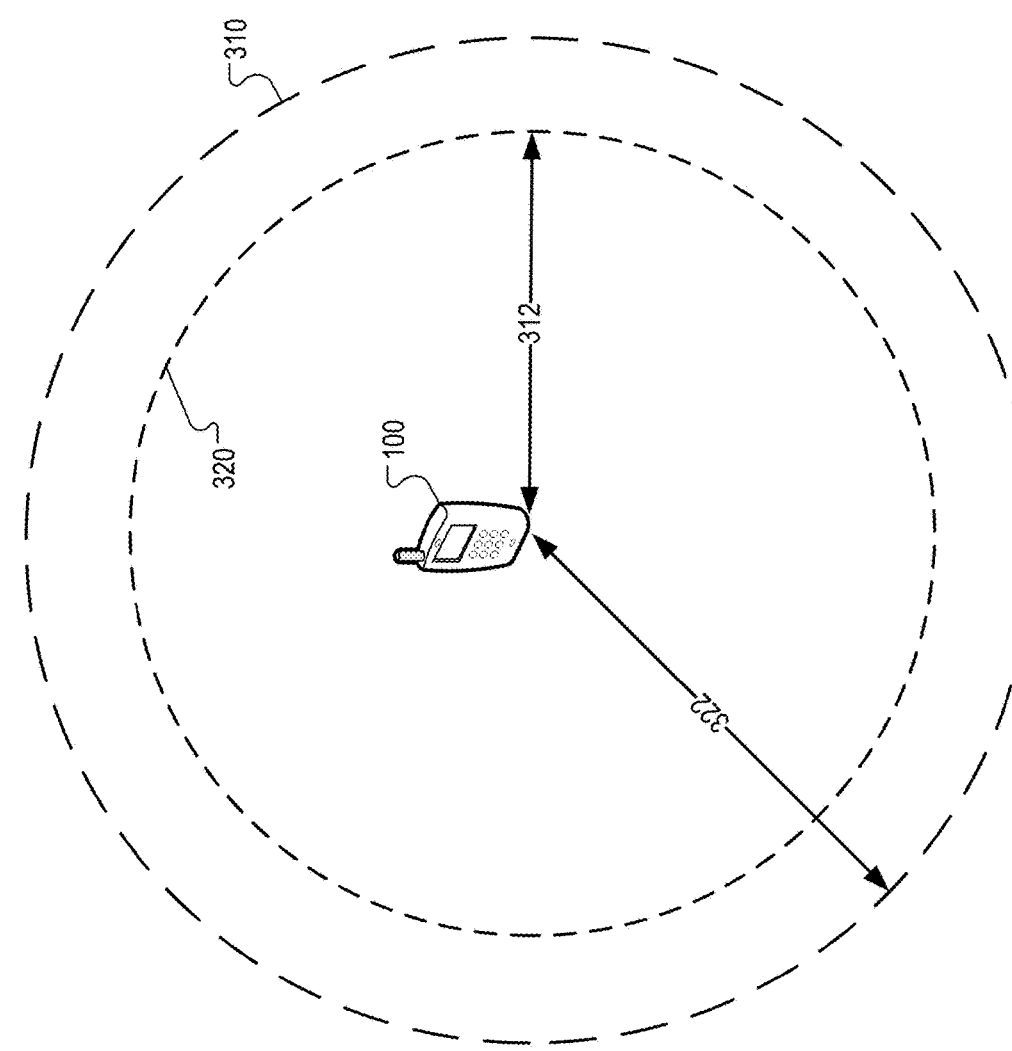
FIG. 3 is a diagram of boundaries of movement of a mobile device.

FIG. 3 is a diagram of boundaries of movement 310, 320 of a mobile device. Each boundary of movement 310, 320 is defined by a radius 312, 322 having an origin at a current location of the mobile device 100. For example, the radius may be a physical measurement such as 10 meters, 100 meters, or another value.

One boundary of movement 310 can be used to determine if the mobile device 100 has not changed location over a period of time. For example, the mobile device 100 can determine that at least one location application is running in a background state on the mobile device 100. The boundary of movement 310 can be established at regular time intervals subsequent to the initial determination that at least one location application is running in a background state on the mobile device 100. For example, the time interval can be one minute, ten minutes, or another period of time. Over the duration of each time interval, the current location of the mobile device 100 is determined and the boundary of movement 310 is established. If the mobile device 100 does not exit the boundary of movement 310 during the period of the time interval, the mobile device 100 can be designated as no longer moving and the GNSS receiver 120 (FIG. 1) of the mobile device 100 can be disabled. If the mobile device 100 does exit the boundary of movement 310 during the period of the time interval, then the GNSS receiver 120 is not disabled and a new boundary of movement 310 can be established when the next time interval commences. In some implementations, the GNSS receiver 120 is re-activated when a location application re-enters a foreground state.

In some implementations, the mobile device 100 does not establish any boundaries of movement until a period of time has elapsed after the mobile device 100 has determined that no location applications are running in a foreground state. For example, the mobile device 100 may wait a period of time such as ten or fifteen minutes after a location application has entered a background state to begin establishing boundaries of movement and determine if the GNSS receiver 120 should be disabled.

In some implementations, a second boundary of movement 320 can be used to determine when to reactivate the mobile device 100. When the mobile device 100 exits the second boundary of movement 320, the mobile device 100 can re-activate the GNSS receiver 120. The second boundary of movement 320 can be established when the GNSS receiver 120 is disabled. Because the GNSS receiver 120 is disabled, various techniques can be used to determine the current location of the mobile device 100. In some examples, the GNSS receiver 120 can remain active in a reduced power state. For example, the GNSS receiver 120 may have a low-power state in which the current location is determined in a low-power way, e.g., by receiving data from fewer satellites or other data sources, or calculating a less precise current location, or conserving power by other techniques. In this example, the GNSS receiver 120 enters the low-power state when the mobile device 100 stops moving rather than being deactivated. As another example, the mobile device 100 can re-activate the GNSS receiver 120 at regular intervals to determine the current location and compare the current location to the location of the mobile device 100 when the second boundary of movement 320 was established. The GNSS receiver 120 would be disabled again if the mobile device 100 determines that the mobile device 100 has not exited the area defined by the second boundary of movement 320. As another example, the mobile device 100 may have other components that can determine a current location of the mobile device 100. For example, the mobile device 100 may have an accelerometer which indicates data describing the velocity of the mobile device 100. The mobile device could use velocity data to calculate a distance traveled by the mobile device 100 since the GNSS receiver 120 was disabled. If the distance traveled calculated based on the accelerometer data indicates that the mobile device 100 has exited the area defined by the second boundary of movement 320 then the GNSS receiver 120 can be re-activated. In some implementations, the mobile device 100 has another kind of low-power location system that can be used to determine a current location of the mobile device 100 when the GNSS receiver 120 is disabled.

In some examples, the second boundary of movement 320 has a different radius 322 than the radius 312 of the first boundary of movement 310. For example, the radius 322 of the second boundary of movement 320 may be larger or smaller than the radius 312 of the first boundary of movement 310. In some examples, the second boundary of movement 320 has the same radius 312 as the first boundary of movement 310.

A boundary of movement need not be defined by a radius and need not have a circular shape. For example, a boundary of movement could be another shape such as a square, an oval, an irregular shape, a shape determined by a geographic feature such as a city block or a building, or the boundary of movement could have another kind of shape.

In some implementations, a boundary of movement can be chosen based on a location type of a location application. For example, if a single location application is running in a background state on the mobile device, an application type of the location application can be used to determine a radius of a boundary of movement to use.

Figure 4:
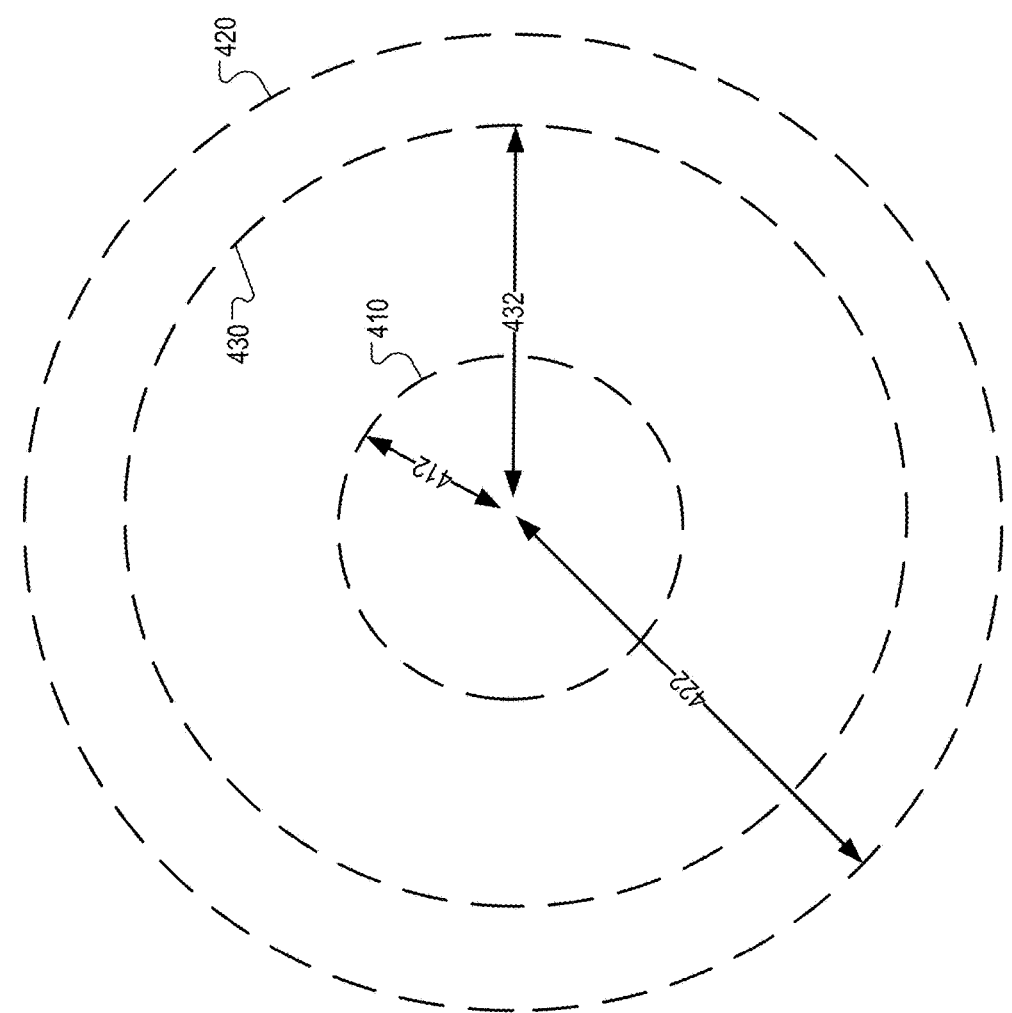
FIG. 4 is a diagram of boundaries of movement of a mobile device which can be chosen based on application type.

FIG. 4 is a diagram of boundaries of movement 410, 420, 430 of a mobile device which can be chosen based on application type. In some example, different amounts of minimal movement, based on different application types, are indicative of whether or not a mobile device 100 has stopped moving and thus a location-based activity has ended.

For example, if a location application running on a mobile device 100 has an application type that indicates it is a personal fitness application, the mobile device 100 can be expected to exhibit a movement pattern characteristic of a user engaging in running or another physical activity. Thus, a boundary of movement 410 can be chosen based on a radius 412 that is relatively small, e.g., one meter or five meters or ten meters. If a user has stopped running, the user may move around within the boundary of movement 410 to engage in short-distance activities such as sitting down, standing up, or other activities defined by movement of just a few meters. In contrast, if the mobile device 100 running the fitness application moves more than a few meters in a time interval such as one minute then the user carrying the mobile device 100 is likely still running and the GNSS receiver 120 should remain active.

If a location application running on a mobile device 100 has an application type that indicates it is an automobile navigation application, the mobile device 100 can be expected to exhibit a movement pattern characteristic of an automobile driving in traffic. Thus, a boundary of movement 420 can be chosen based on a radius 422 that is relatively large, e.g., twenty meters or one hundred meters. If an automobile has reached a destination or has otherwise stopped, the mobile device 100 used for navigation may still move around within a range defined by several dozen meters. For example, the automobile carrying the mobile device 100 may be driving around in a parking lot, or a user carrying the mobile device 100 may have exited the automobile and is walking around a building or other confined space. In contrast, if the mobile device 100 running the automobile navigation application moves more than several dozen meters in a time interval such as one minute then the mobile device 100 is likely still in an automobile undergoing travel and the GNSS receiver 120 should remain active.

In some examples, an application type of a location application is assigned to the location application. For example, the program code of a location application can include a descriptor indicating the application type. An example of an application type 202 for a location application 200 is shown in FIG. 2.

In some implementations, a location application running in a background state on the mobile device 100 does not have an application type assigned. In some implementations, the location application can be designated as having a default application type. The default application type can be used with a default boundary of movement 430 defined by a radius 432 different from the radius used by other boundaries of movement 410, 420 used for location applications having a specific application type. The default boundary of movement 430 can be chosen based on average or typical movement patterns indicative of a range of activities for which location data is relevant (e.g., activities such as walking, running, driving, or other activities).

In some implementations, an application type can be determined for a location application having no designated application type. For example, the mobile device 100 can determine an application type based on movement patterns exhibited by the mobile device 100.

In some examples, the mobile device can determine a speed of motion of the mobile device 100 and determine an application type of a location application based on the speed of motion. For example, the mobile device 100 may be moving at a speed such as one to ten miles per hour that indicates that the mobile device 100 is being carried by a user who is walking or running. In this example, the application type of a location application running in a background state can be designated as a personal fitness application. As another example, the mobile device 100 may be moving at a speed such as forty to fifty miles per hour that indicates that the mobile device 100 is being carried within an automobile that is in motion on roads or highways. In this example, the application type of a location application running in a background state can be designated as an automobile navigation application. The speed of motion can be determined at a particular instant or as an average over a period of time.

In some examples, the mobile device can determine acceleration data for the mobile device 100 and determine an application type of a location application based on the acceleration data. For example, the mobile device 100 may exhibit an acceleration pattern indicative of being carried by a user who is running. The acceleration data may indicate that the mobile device 100 is likely bouncing within a clothing pocket of the user, for example. In this example, the application type of a location application running in a background state can be designated as a personal fitness application.

In some implementations, other techniques can be used to determine an application type of a location application based on the acceleration data. For example, if the mobile device 100 has a pedometer component, the pedometer can be used to determine a walking or running state of a user carrying the mobile device 100. For example, a high and periodic magnitude of acceleration may indicate a running state of the user. As another example, the mobile device 100 may determine that the mobile device 100 is in an automobile based on speed estimates and frequency domain characteristics that show vibrations characteristic of vehicular travel.

The speed of motion or the acceleration data can be determined according to data received from the GNSS receiver 120, according to data received from an accelerometer component of the mobile device 100, or a combination of data received from both of these components or other components.

Figure 5:
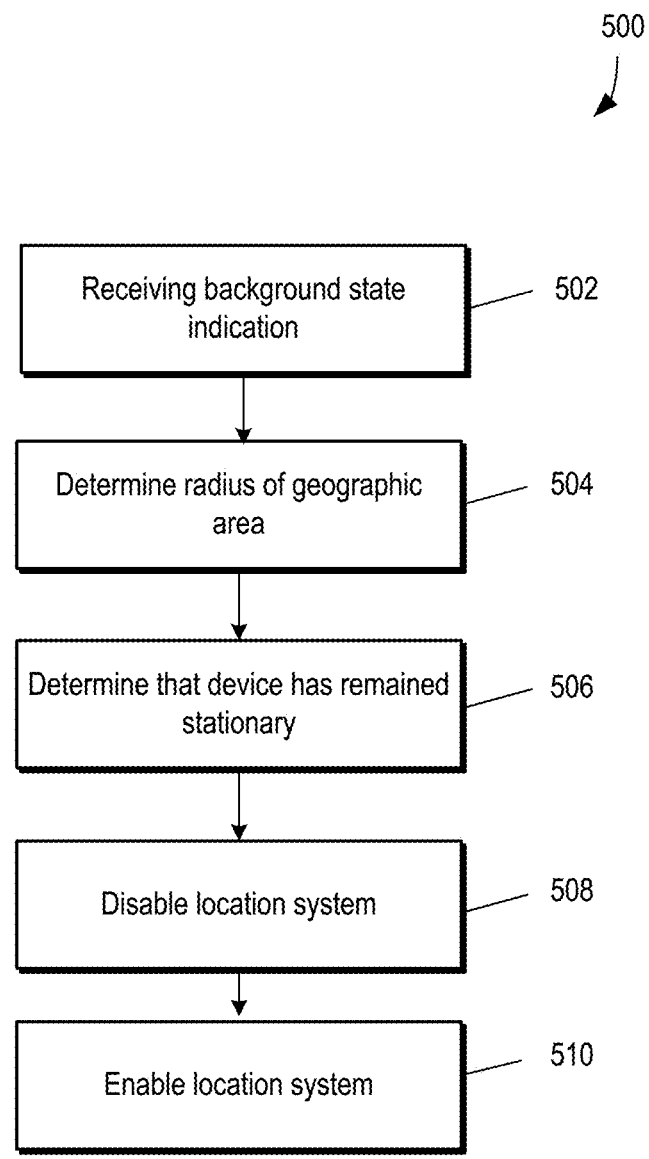
FIG. 5 is a flowchart of an exemplary process of operating a geographic location system.

FIG. 5 is flow diagram of an exemplary process 500 for operating location systems. The process 500 can be performed, for example, by the mobile device 100 shown in FIG. 1.

An indication that an application executing on the wireless mobile device has entered a background state can be received (502). For example, a user of the mobile device 100 may have indicated on a user interface that the application should enter a background state.

In some implementations, a radius is determined for a geographic area (504). The geographic area can be used to determine if the wireless mobile device has remained stationary for a period of time. For example, in some implementations, the radius is determined according to an application type of the application that has entered the background state.

The application type can indicate an intended use of the application. For example, the application type may indicate that the application is intended for use as an automobile navigation application, or a personal fitness application, or another kind of application. In some implementations, the application type can be received from the application executing on the wireless mobile device, and the radius defining the geographic area is based on the received application type. For example, the wireless mobile device may store a table of application types and a radius associated with each application type.

In some implementations, the application may not be assigned an application type applicable to determining the radius defining the geographic area. The mobile device may determine an application type of the application executing on the wireless mobile device based on second data received from the location system of the wireless mobile device. The second data could be data indicative of acceleration of the wireless mobile device, for example, or the data could be data indicative of speed of motion of the wireless handheld device, for example, or the data could be other kinds of data.

A determination can be made that the wireless mobile device has remained stationary within a time interval (506). The determination is based on data received from a location system of the wireless mobile device. For example, the location system can be a GNSS receiver such as the GNSS receiver 120 shown in FIG. 1. Other components can also be used as a location system, such as an accelerometer, a WiFi transceiver, a cellular network transceiver, or another kind of component which can indicate location or movement of the wireless mobile device.

In some implementations, speed data is used to determine if the wireless mobile device has remained stationary. For example, if the location system indicates that the wireless mobile device has remained below a threshold speed for a period of time, then the wireless mobile device can be identified as having remained stationary for the period of time. The threshold speed could vary based on application type, such that the threshold speed for an automobile navigation application is higher than a personal fitness application.

In some implementations, the mobile device can make an inference about the status of the location and movement of the mobile device based on a status of the GNSS receiver. For example, the mobile device may determine that the GNSS receiver is not able to determine location data for the mobile device. If the GNSS receiver uses signals transmitted from satellites to determine location data, the GNSS receiver may not be able to determine location data if the satellite signals are obstructed. If the mobile device is at an indoor location, the satellite signals may be unavailable, because the signals transmitted from the satellites may not penetrate building walls or floors. If the mobile device determines that the GNSS receiver is not able to determine location data for the mobile device, the mobile device can infer that the mobile device is indoors. If the mobile device infers that the mobile device is indoors, the mobile device can disable the GNSS receiver 120, for example, if a location application running on the mobile device is intended for outdoor use such as a fitness application or a navigation application. In this way, the mobile device can evaluate a status of its location system to determine that the mobile device is in a location of a type other than a type of location associated with a location application. The mobile device can then take an action such as disabling the GNSS receiver.

In some implementations, if the GNSS receiver is not able to determine location data for the mobile device, the mobile device may use another location system to determine location data for the mobile device. For example, if the mobile device has a communications network transceiver such as a WiFi transceiver, the mobile device may be able to use the WiFi transceiver to determine location data (e.g., based on known location of WiFi hotspots, or based on other information carried by WiFi signals that are received by the mobile device). If the GNSS receiver is not able to determine location data for the mobile device, the mobile device can disable the GNSS receiver and opt to use a WiFi transceiver instead.

In some implementations, the determination is made by determining that the mobile device has remained within a geographic area during the time interval. The geographic area could be defined by the radius determined according to an application type of the application (e.g., operation 504).

In some implementations, the location system of the mobile device is not disabled even though the mobile device has been determined to have remained stationary. For example, the mobile device may determine that the mobile device is in an automobile based on current or previously determined speed estimates and frequency domain characteristics that show vibrations characteristic of vehicular travel. In some implementations, the mobile device can use data such as speed estimates and frequency domain characteristics to generate a state space model of the past or current environment. The mobile device could collect this data on an ongoing basis to determine the current environment (e.g., in a stopped vehicle) until unchanged, for example, until accelerometer data or other data provides an indication of an alternative state such as walking (thus indicating that the mobile device is no longer in a vehicle). In this example, the mobile device may be inside an automobile that is paused in standstill traffic. The determination can be made based on data received from the location system or from another component such as accelerometer or from a combination of these components. If the location application running in the background of the mobile device is an automobile navigation application and the mobile device has determined that the mobile device is in an automobile that is running but at a standstill (e.g., based on the vibration patterns), the location system may remain enabled. In this way, the GNSS receiver (or another location system) can be disabled or remain enabled based on a determination that a user is engaged in a particular activity, such as driving, running, or another activity involving motion.

In some implementations, data provided by an accelerometer is used to determine if the mobile device has remained stationary for a period of time. For example, the accelerometer can generate data indicative of acceleration of the device. The acceleration data can be used to determine if the device is or is not in motion. In this scenario, data provided by a GNSS receiver need not be consulted. For example, if the mobile device is indoors, the data provided by the GNSS receiver may be unreliable or unavailable due to weak strength of the GNSS signals.

In some examples, an accelerometer will indicate acceleration data when the device is stationary, for example, data indicative of the force of gravity. Data indicative of known forces such as the force of gravity can be removed from the data provided by the accelerometer to determine if the device is stationary with respect to a local frame of reference. A local frame of reference is sometimes known as a local level frame.

A portion of the location system of the wireless mobile device can be disabled (508). In some implementations, the wireless mobile device powers down the location system. In some implementations, the wireless mobile device maintains power to the location system at a level of power lower than the level of power drawn by the location system when the location system operates at a full capacity or a full level of operation. For example, the wireless mobile device may switch the location system to a low-power mode. In some implementations, the location system includes a GNSS receiver and another location component or components. For example, the wireless mobile device may disable the GNSS receiver and not disable the other location component or components.

The location system of the wireless mobile device can be enabled (510). In some implementations, the wireless mobile device determines, based on data received from the location system of the wireless mobile device, that the wireless mobile device has exited a geographic area. The wireless mobile device then re-enables the location system (for example, re-enables the portions of the location system that were previously disabled) upon this determination. In some examples, the geographic area is a second geographic area defined by a second radius. In some implementations, the wireless mobile device receives an indication that that the application executing on the wireless mobile device has entered a foreground state, and the location system is re-enabled upon receiving this indication. In some implementations, the wireless mobile device determines, based on data received from the location system of the wireless mobile device, that the wireless mobile device is moving at a speed above a threshold speed. The wireless mobile device then re-enables the location system (for example, re-enables the portions of the location system that were previously disabled) upon this determination.

Figure 6:
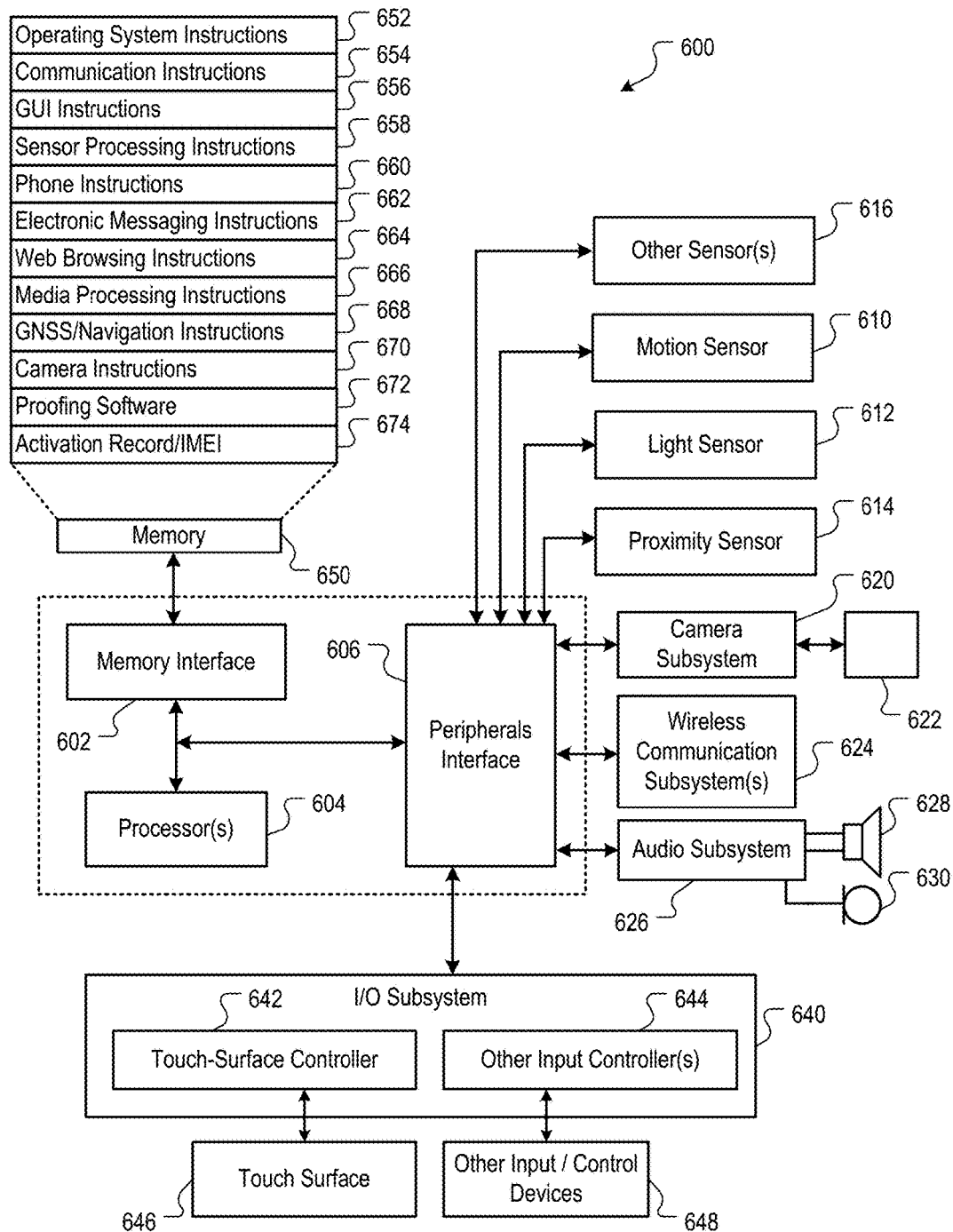
FIG. 6 is a block diagram of an exemplary system architecture implementing the features and processes of FIGS. 1-5.

FIG. 6 is a block diagram of an example computing device 600 that can implement the features and processes of FIGS. 1-5. The computing device 600 can include a memory interface 602, one or more data processors, image processors and/or central processing units 604, and a peripherals interface 606. The memory interface 602, the one or more processors 604 and/or the peripherals interface 606 can be separate components or can be integrated in one or more integrated circuits. The various components in the computing device 600 can be coupled by one or more communication buses or signal lines.

Sensors, devices, and subsystems can be coupled to the peripherals interface 606 to facilitate multiple functionalities. For example, a motion sensor 610, a light sensor 612, and a proximity sensor 614 can be coupled to the peripherals interface 606 to facilitate orientation, lighting, and proximity functions. Other sensors 616 can also be connected to the peripherals interface 606, such as a global navigation satellite system (GNSS) (e.g., GPS receiver), a temperature sensor, a biometric sensor, or other sensing device, to facilitate related functionalities. In some examples, the motion sensor 610 is an accelerometer. For example, the motion sensor 610 may detect acceleration of the computing device 600, speed of motion of the computing device 600, and other values indicative of the movement of the computing device 600.

A camera subsystem 620 and an optical sensor 622, e.g., a charged coupled device (CCD) or a complementary metaloxide semiconductor (CMOS) optical sensor, can be utilized to facilitate camera functions, such as recording photographs and video clips. The camera subsystem 620 and the optical sensor 622 can be used to collect images of a user to be used during authentication of a user, e.g., by performing facial recognition analysis.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which the computing device 600 is intended to operate. For example, the computing device 600 can include communication subsystems 624 designed to operate over a GSM network, a GPRS network, an EDGE network, a Wi-Fi or WiMax network, and a Bluetooth™ network. In particular, the wireless communication subsystems 624 can include hosting protocols such that the device 100 can be configured as a base station for other wireless devices.

An audio subsystem 626 can be coupled to a speaker 628 and a microphone 630 to facilitate voice-enabled functions, such as speaker recognition, voice replication, digital recording, and telephony functions. The audio subsystem 626 can be configured to facilitate processing voice commands, voiceprinting and voice authentication. In some implementations, audio recorded by the audio subsystem 626 is transmitted to an external resource for processing. For example, voice commands recorded by the audio subsystem 626 may be transmitted to a network resource such as a network server which performs voice recognition on the voice commands.

The I/O subsystem 640 can include a touch-surface controller 642 and/or other input controller(s) 644. The touch-surface controller 642 can be coupled to a touch surface 646. The touch surface 646 and touch-surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 646.

The other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of the speaker 628 and/or the microphone 630.

In one implementation, a pressing of the button for a first duration can disengage a lock of the touch surface 646; and a pressing of the button for a second duration that is longer than the first duration can turn power to the computing device 600 on or off. Pressing the button for a third duration can activate a voice control, or voice command, module that enables the user to speak commands into the microphone 630 to cause the device to execute the spoken command. The user can customize a functionality of one or more of the buttons. The touch surface 646 can, for example, also be used to implement virtual or soft buttons and/or a keyboard.

In some implementations, the computing device 600 can present recorded audio and/or video files, such as MP3, AAC, and MPEG files. In some implementations, the computing device 600 can include the functionality of an MP3 player. Other input/output and control devices can also be used.

The memory interface 602 can be coupled to memory 650. The memory 650 can include high-speed random access memory and/or non-volatile memory, such as one or more magnetic disk storage devices, one or more optical storage devices, and/or flash memory (e.g., NAND, NOR). The memory 650 can store an operating system 652, such as Darwin, RTXC, LINUX, UNIX, OS X, WINDOWS, or an embedded operating system such as VxWorks.

The operating system 652 can include instructions for handling basic system services and for performing hardware dependent tasks. In some implementations, the operating system 652 can be a kernel (e.g., UNIX kernel). In some implementations, the operating system 652 can include instructions for performing voice authentication. For example, operating system 652 can implement the security lockout and voice authentication features. Operating system 652 can implement the voiceprint and voice authentication features.

The memory 650 can also store communication instructions 654 to facilitate communicating with one or more additional devices, one or more computers and/or one or more servers. The memory 650 can include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS and navigation-related processes and instructions; and/or camera instructions 670 to facilitate camera-related processes and functions.

The memory 650 can store other software instructions 672 to facilitate other processes and functions, such as the security and/or authentication processes and functions. For example, the software instructions can include instructions for performing voice authentication on a per application or per feature basis and for allowing a user to configure authentication requirements of each application or feature available on device 100.

The memory 650 can also store other software instructions (not shown), such as web video instructions to facilitate web video-related processes and functions; and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively. An activation record and International Mobile Equipment Identity (IMEI) 674 or similar hardware identifier can also be stored in memory 650.

Each of the above identified instructions and applications can correspond to a set of instructions for performing one or more functions described above. These instructions need not be implemented as separate software programs, procedures, or modules. The memory 650 can include additional instructions or fewer instructions. Furthermore, various functions of the computing device 600 can be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims. For example, rather than disabling a location system, the mobile device can disable or pause a location application running on the mobile device based on an indication that an activity associated with the location application (e.g., running or driving in an automobile) is no longer taking place.

What is claimed is:

1. A method comprising:
   receiving, on a mobile device, an indication that an application executing on the mobile device has entered a background state;
   accessing one or more elements of data each representing a boundary and each being stored in association with acceleration data representing a respective type of application;
   determining an acceleration pattern of the mobile device based on data received from a motion sensor of the mobile device;
   comparing the determined acceleration pattern with the acceleration data representing a respective type of application;
   determining, based upon the comparing, a particular type of the application executing in the background state on the mobile device;
   selecting, based upon determining the particular type of the application, a boundary specific to the particular type of the application executing in the background state on the mobile device;
   determining, based on data received from a location system of the mobile device, that the mobile device has remained within a first geographic area during a time interval, the first geographic area being defined by the selected boundary specific to the particular type of the application executing in the background state on the mobile device; and
   disabling at least a portion of the location system of the mobile device based upon determining that the mobile device has remained within a first geographic area during a time interval.

2. The method of claim 1, wherein the boundary specific to the particular type of the application executing in the background state on the mobile device is defined by a radius stored in association with the data representing the respective type of application.

3. The method of claim 1, comprising:
   determining, based upon the comparing, that the application executing in the background state on the mobile device is not an application type applicable to determining the boundary defining the first geographic area; and in response, determining the particular type of the application executing in the background state on the mobile device.

4. The method of claim 1, wherein the data received from the motion sensor of the mobile device comprises data indicative of acceleration of the mobile device.

5. The method of claim 1, wherein the data received from the motion sensor of the mobile device comprises data indicative of speed of the mobile device.

6. The method of claim 1, comprising:
determining, based on data received from the location system of the mobile device, that the mobile device has exited a second geographic area, the second geographic area being defined by a second boundary determined according to the particular type of the application executing in the background state on the mobile device; and in response, enabling the portion of the location system of the mobile device.

7. The method of claim 1, comprising:
receiving, on the mobile device, an indication that the particular application executing in the background state on the mobile device has entered a foreground state; and in response, enabling the portion of the location system of the mobile device.

8. The method of claim 1, wherein the mobile device is a wireless mobile device.

9. The method of claim 1, comprising:
determining, based on an absence of data received by the location system, that the mobile device is in a location of a type other than a type of location associated with the particular application executing in the background state on the mobile device, and in response, disabling at least a portion of the location system of the mobile device.

10. The method of claim 1, comprising determining an activity of a user of the mobile device based on the acceleration pattern of the mobile device,
wherein the data representing the particular type of the application executing in the background state on the mobile device is determined based on the determined activity of the user.

11. The method of claim 1, wherein the location system of the mobile device comprises an accelerometer, and the data received from the location system of the mobile device includes data from the accelerometer indicates that the mobile device has remained stationary during the time interval.

12. A system comprising:
a mobile device configured to:
receive an indication that an application executing on the mobile device has entered a background state;
access one or more elements of data each representing a boundary and each being stored in association with acceleration data representing a respective type of application;
determine an acceleration pattern of the mobile device based on data received from a motion sensor of the mobile device;
compare the determined acceleration pattern with the acceleration data representing a respective type of application;
determine, based upon the comparison, a particular type of the application executing in the background state on the mobile device;
select, based upon the determined particular type of the application, a boundary specific to the particular type of the application executing in the background state on the mobile device;
determine, based on data received from a location system of the mobile device, that the mobile device has remained within a first geographic area during a time interval, the first geographic area being defined by the selected boundary specific to the particular type of the application executing in the background state on the mobile device; and
disable at least a portion of the location system of the mobile device based upon the determination that the mobile device has remained within a first geographic area during a time interval.

13. The system of claim 12, wherein the mobile device is configured to define the boundary specific to the particular type of application executing in the background state on the mobile device based on a radius stored in association with the data representing the respective type of application.

14. The system of claim 12, wherein the mobile device is configured to:
determine, based upon the comparison, that the application executing in the background state on the mobile device is not an application type applicable to determining the boundary defining the first geographic area; and
in response, determine the particular type of the application executing in the background state on the mobile device.

15. The system of claim 12, wherein the data received from the motion sensor of the mobile device comprises data indicative of acceleration of the mobile device.

16. The system of claim 12, wherein the data received from the motion sensor of the mobile device comprises data indicative of speed of the mobile device.

17. The system of claim 12, wherein the mobile device is configured to:
determine, based on data received from the location system of the mobile device, that the mobile device has exited a second geographic area, the second geographic area being defined by a second boundary determined according to the particular type of the application executing in the background state on the mobile device; and
in response, enable the portion of the location system of the mobile device.

18. The system of claim 12, wherein the mobile device is configured to:
receive an indication that the application executing in the background state on the mobile device has entered a foreground state; and
in response, enable the portion of the location system of the mobile device.

19. The system of claim 12, wherein the mobile device is a wireless mobile device.

20. The system of claim 12, wherein the mobile device is configured to:
determine, based on an absence of data received by the location system, that the mobile device is in a location of a type other than a type of location associated with the particular application executing in the background state on the mobile device, and in response, disable at least a portion of the location system of the mobile device.

21. The system of claim 12, wherein the mobile device is configured to:
  determine an activity of a user of the mobile device based on the acceleration pattern of the mobile device,
  wherein the data representing the particular type of the application executing in the background state on the mobile device is determined based on the determined activity of the user.

22. The system of claim 12, wherein the location system of the mobile device comprises an accelerometer, and the data received from the location system of the mobile device includes data from the accelerometer indicates that the mobile device has remained stationary during the time interval.

23. A computer program product stored on a storage device and configured to cause a mobile device to perform operations comprising:
  receiving, on a mobile device, an indication that an application executing on the mobile device has entered a background state;
  accessing one or more elements of data each representing a boundary and each being stored in association with acceleration data representing a respective type of application;
  determining an acceleration pattern of the mobile device based on data received from a motion sensor of the mobile device;
  comparing the determined acceleration pattern with the acceleration data representing a respective type of application;
  determining, based upon the comparing, a particular type of the application executing in the background state on the mobile device;
  selecting, based upon determining the particular type of the application, a boundary specific to the particular type of the application executing in the background state on the mobile device;
  determining, based on data received from a location system of the mobile device, that the mobile device has remained within a first geographic area during a time interval, the first geographic area being defined by the selected boundary specific to the particular type of application executing in the background state on the mobile device; and
  disabling at least a portion of the location system of the mobile device based upon the determination that the mobile device has remained within a first geographic area during a time interval.

24. The computer program product of claim 23, wherein the boundary specific to the particular type of the application executing in the background state on the mobile device is defined by a radius stored in association with the data representing the respective type of application.

25. The computer program product of claim 23, the operations comprising:
  determining, based upon the comparing, that the application executing in the background state on the mobile device is not an application type applicable to determining the boundary defining the first geographic area; and
  in response, determining the particular type of the application executing in the background state on the mobile device.

26. The computer program product of claim 23, wherein the data received from the motion sensor of the mobile device comprises data indicative of acceleration of the mobile device.

27. The computer program product of claim 23, wherein the data received from the motion sensor of the mobile device comprises data indicative of speed of the mobile device.

28. The computer program product of claim 23, the operations comprising:
  determining, based on data received from the location system of the mobile device, that the mobile device has exited a second geographic area, the second geographic area being defined by a second boundary determined according to the particular type of the application executing in the background state on the mobile device; and
  in response, enabling the portion of the location system of the mobile device.

29. The computer program product of claim 23, the operations comprising:
  receiving, on the mobile device, an indication that the particular application executing in the background state on the mobile device has entered a foreground state; and
  in response, enabling the portion of the location system of the mobile device.

30. The computer program product of claim 23, wherein the mobile device is a wireless mobile device.

31. The computer program product of claim 23, the operations comprising:
  determining, based on an absence of data received by the location system, that the mobile device is in a location of a type other than a type of location associated with the application executing in the background state on the mobile device, and
  in response, disabling at least a portion of the location system of the mobile device.

32. The computer program product of claim 23, comprising:
  determining an activity of a user of the mobile device based on the acceleration pattern of the mobile device,
  wherein the data representing the particular type of the application executing in the background state on the mobile device is determined based on the determined activity of the user.

33. The computer program product of claim 23, wherein the location system of the mobile device comprises an accelerometer, and the data received from the location system of the mobile device includes data from the accelerometer indicates that the mobile device has remained stationary during the time interval.

34. A method comprising:
  executing, on a mobile device, an application being capable of entering a background state in which at least some functionality of the application is disabled, the application configured to carry out steps comprising:
    entering a background state,
    while the application is in the background state, refraining from accessing location data that would otherwise be used by the at least some functionality of the application, and
    exiting the background state in response to a signal indicative that at least a portion of a location system of the mobile device has been reactivated and that the application can access location data of a kind used by the at least some functionality of the application, the location system having been deactivated, while the application was in the background state, based on a determination that the mobile device remained within a first geographic area during a time interval, the first geographic area being defined by a boundary defined by data stored on the mobile device in association with acceleration data representing an application type, the application type based upon data determined to represent a type of the application that was in the background state, and based at least in part on an acceleration pattern of the mobile device determined based on data received from a motion sensor of the mobile device.

35. The method of claim 34, wherein the boundary specific to the application type is defined by a radius stored in association with the data representing the application type.

36. The method of claim 34, wherein the application type is determined by the mobile device based on data other than data stored in association with the application in the background state.

37. The method of claim 34, wherein the signal comprises an indication to the application in the background state to enter a foreground state.

38. The method of claim 34, wherein the functionality of the application in the background state includes functionality associated with processing location data to determine a location of the mobile device.

39. The method of claim 34, wherein the one or more features of the application in the background state include features associated with navigation.

40. The method of claim 34, wherein the signal is indicative of a determination that, based on data received from the location system of the mobile device, the mobile device has exited a second geographic area, the second geographic area being defined by a second boundary determined according to the application type of the application.

41. The method of claim 34, wherein the determination that the mobile device remained within the first geographic area includes a determination that the mobile device was in motion within the first geographic area during at least some of the time in which the application was in the background state.

42. The method of claim 34, wherein the application type represents an activity associated with the application in the background state.

43. The method of claim 34, comprising:

accessing, by the mobile device, a table stored in data storage of the mobile device, the table comprising one or more elements of data each representing the boundary and one or more elements of data each representing the application type, wherein each element of data representing the boundary is associated with a respective element of data representing the application type.

* * * * *